United States Patent [19]
Bowker et al.

[11] Patent Number: 5,333,195
[45] Date of Patent: * Jul. 26, 1994

[54] TELEPHONE NETWORK SPEECH SIGNAL ENHANCEMENT

[75] Inventors: Duane O. Bowker, Neptune City; John T. Ganley, Milford; J. H. James, Farmingdale, all of N.J.

[73] Assignee: AT&T Bell Laboratories, Murray Hill, N.J.

[*] Notice: The portion of the term of this patent subsequent to Jun. 23, 2009 has been disclaimed.

[21] Appl. No.: 13,511

[22] Filed: Feb. 4, 1993

Related U.S. Application Data

[63] Continuation of Ser. No. 620,997, Dec. 3, 1990, Pat. No. 5,195,132.

[51] Int. Cl.$^5$ .............................................. H04M 1/76
[52] U.S. Cl. .................................. 379/410; 379/414; 379/400; 379/409
[58] Field of Search .............. 379/414, 400, 401, 410, 379/406, 409; 370/32, 32.1

[56] References Cited

U.S. PATENT DOCUMENTS

| | | | |
|---|---|---|---|
| 3,781,481 | 12/1973 | Shaffer et al. | 179/16 F |
| 3,784,756 | 1/1974 | Nemchik | 179/16 F |
| 3,818,151 | 6/1974 | Chambers, Jr. et al. | 179/170 T |
| 3,911,370 | 10/1975 | Pace | 330/21 |
| 4,054,941 | 10/1977 | Shichman | 179/16 F |
| 4,056,688 | 11/1977 | Stiefel | 179/16 F |
| 4,132,863 | 1/1979 | Smith | 179/16 F |
| 4,277,655 | 7/1981 | Surprenant | 179/170 R |
| 4,315,107 | 2/1982 | Ciesielka et al. | 179/16 F |
| 4,490,848 | 12/1984 | Bose et al. | 381/102 |
| 4,535,445 | 8/1985 | Lane et al. | 370/62 |
| 4,809,338 | 2/1989 | House | 381/103 |
| 5,195,132 | 3/1993 | Banker et al. | 379/410 |

FOREIGN PATENT DOCUMENTS 0260933 10/1989 Japan ................................... 379/414

OTHER PUBLICATIONS

Hobby Electronics, Mar. 1982, vol. 4, No. 3, "Stereo Bass Booster", pp. 52-54, Author unknown.

Primary Examiner—James L. Dwyer
Assistant Examiner—M. Shehata
Attorney, Agent, or Firm—Frederick B. Luludis

[57] ABSTRACT

The quality of voice signals transmitted by a telephone station set, or similar device, are enhanced in accordance with the steps of the instant method before such signals are delivered to a receiving telephone station set by restoring the level of speech energy attenuated by the transmitting set, in which such restoration is performed at a point along a telephone connection between the transmitting and receiving telephone stations, for example, at a point within a telecommunications system which establishes the connection.

28 Claims, 3 Drawing Sheets

TELEPHONE NETWORK SPEECH SIGNAL ENHANCEMENT

This is a continuation of application Ser. No. 07/620997 filed Dec. 3, 1990 U.S. Pat. No. 5,195,132 issued Mar. 16, 1993.

FIELD OF THE INVENTION

The invention relates to a method of processing speech signals transmitted by a telephone station set, and more particularly relates to a method of enhancing the quality of such signals before they are supplied to a receiving telephone station set.

BACKGROUND OF THE INVENTION

It is well-known in the art of high-fidelity and stereo recordings that the overall quality of the reproduction of sound signals obtained from a source such as, magnetic tape, a record, etc., may be enhanced in certain situations (e.g., low listening levels) by raising the level of those signals having frequencies within the so-called bass region. However, the designers of telecommunications systems have heretofore taken an opposite approach and have purposely discriminated against speech signals residing in the bass region, thereby degrading the overall quality of speech signals that are delivered to an intended destination, e.g., a telephone station set.

The reason for such discrimination is that surveys show that the predominant sources of ambient (background) noise have most of their energy in the low frequency range. Accordingly, to prevent a telephone station set that is in use from "picking up" such noise, the station set transmitter is designed so that it noticeably attenuates signals below 300 Hz. In fact, the Electronic Industries Association (EIA) standard RS-470, published January, 1981, and relating to the design of telephone instruments recommends such attenuation below 300 Hz. What this means is that the quality of voice signals that are received at a telephone station set is noticeably diminished as a result of severely attenuating the level of such signals below 300 Hz at the transmitting telephone station set.

SUMMARY OF THE INVENTION

The quality of voice signals as perceived by a telephone listener is greatly enhanced, in accordance with the inventive method, by disposing in a telecommunications network, external to telephone station sets or similar devices, a method of restoring the level of speech energy attenuated by a transmitting telephone station set. In particular, the inventive method is directed to arranging a telecommunications network so that it selectively amplifies by a predetermined level a telephone speaker's voice signals that are within a predetermined frequency range, e.g., 100-300 Hz, relative to the remainder of the telephone passband, before supplying such signals to a receiving telephone station set.

DETAILED DESCRIPTION

Figure 1:
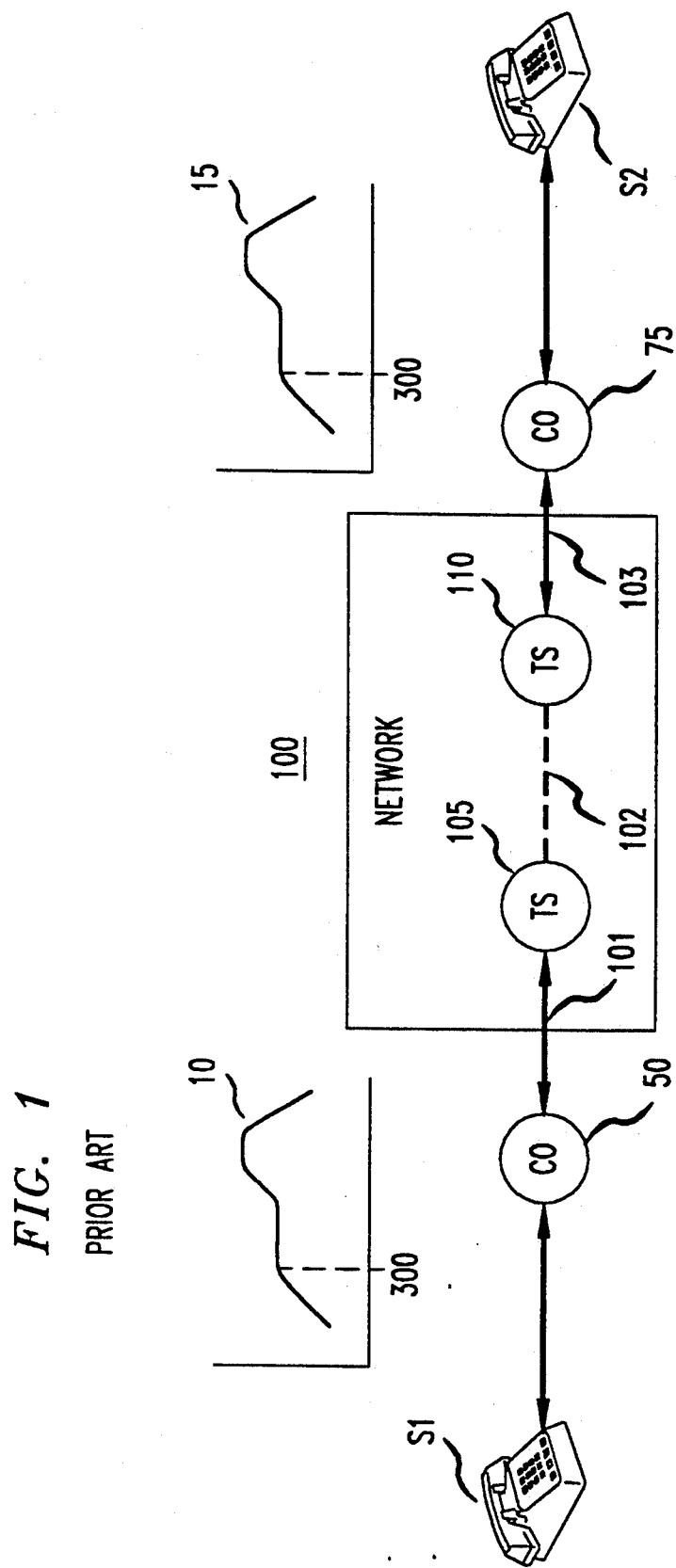
FIG. 1 is a broad block diagram of a telecommunications system illustrating the effect of attenuating speech signals within the bass band.

Turning now to FIG. 1, there is shown a simplified block diagram of a telecommunications network 100, which may be, for example, the AT&T network. As is well-known, the AT&T network comprises, inter alia, a plurality of toll offices, such as toll offices 105 and 110, that may be interconnected to one another to provide long distance voice and data connections for its subscribers, such as the telephone users associated with station sets S1 and S2. The manner in which a telephone user, e.g., the user associated with station S1, establishes via network 100 a telephone connection to another such user, e.g., the user associated with station S2, is well-known and will not be described herein. However, it suffices to say that a telephone user (hereinafter also "subscriber") may establish such a connection by causing station S1 to go "off hook" and then dialing the telephone number associated with station S2. Local central office 50 associated with station S1 collects the telephone digits as they are dialed and establishes a connection 101 to a network 100 toll office, e.g., toll office 105 (also referred to herein as a toll switch). Toll office, or switch, 105, in turn, and based on the dialed telephone number that it receives from local central office 50, establishes a connection 102 to a so-called destination toll switch, such as toll switch 110. Destination toll switch 110, in turn, extends the connection to central office 75 associated with station S2 and passes to that office the dialed telephone number. The latter central office responsive to receipt of the dialed digits then extends the connection 103 to station S2. The subscribers positioned respectively at stations S1 and S2 may then begin to speak to one another via the established connection.

However, as a result of the aforementioned signal attenuation that is introduced by a telephone station set, e.g., station S1, the quality of the voice signals that the station transmits will be greatly diminished and, therefore, will not represent the speaker's true voice signals. This aspect is graphically illustrated in FIG. 1, in which curve 10 depicts the frequency response characteristic of the filter applied to the speech signals that station S1 supplies to toll switch 105 via line 101.

It can be seen from curve 10 that, as a result of the station S1 filter, the speaker's voice signals "rolls off" sharply below 300 Hz, at a rate of approximately 12 dB per octave in accord with the aforementioned EIA RS-470 standard. Accordingly, a significant amount of the speech energy within the bass range is attenuated at a transmitting station set, e.g., S1, and, therefore, is not supplied to network 100 for delivery to a receiving station set, e.g., S2, as illustrated by filter response curve 15.

After carefully reviewing curves 10 and 15 and the speech processing limitation of telephone switching equipment, we have recognized that, in accordance with the invention, the quality of telephone speech signals could be readily enhanced to offset the effect of transmitter attenuation, and that such enhancement may be performed at some point along the connection between the transmitting and receiving telephone station sets. In this way, the resulting signals that are supplied to the receiving station set would be more representative of the speaker's voice than the signals outputted by the transmitting station set. It is to be understood of course that such enhancement would also increase the level of the aforementioned ambient noise. However, studies show that most telephone users prefer to listen to enhanced speech, with an attendant increase in the level of background noise, rather than speech which has not been so enhanced.

Moreover, we have recognized that, in accordance with an aspect of the invention, such signal enhancement could be readily performed at a central location which is involved in establishing a telephone connection between two telephone station sets, and which may be readily adapted to enhance the quality of speech signals. Such a central location may be, for example, network 100, as shown in FIG. 2.

Figure 2:
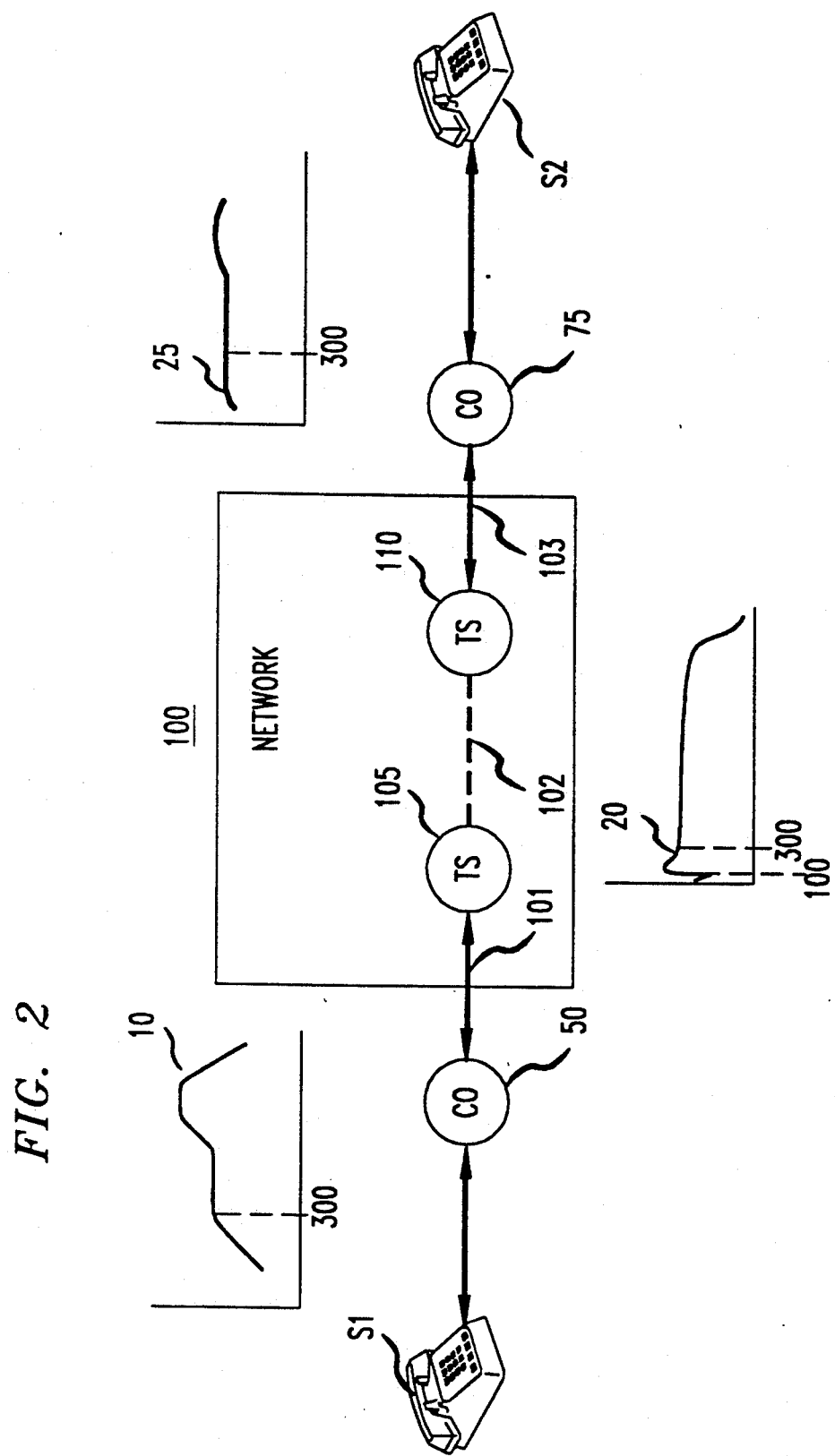
FIG. 2 is a broad block diagram of the telecommunications system of FIG. 1 and illustrates the effect of enhancing speech signals before such signals are supplied to a receiving telephone station set.

(It can be appreciated that FIG. 2 is similar in certain respects to FIG. 1. Consequently, elements in FIG. 2 which are identical to those shown in FIG. 1 are similarly numbered.)

Referring then to FIG. 2, network 100 is now arranged in accord with frequency response curve 20 to compensate the level of speech signals that it receives from a transmitting telephone station set. In particular, the frequency response of curve 20 is particularly designed to increase, or boost, the level of speech signals below a predetermined frequency—illustratively 300 Hz. Such compensation may be achieved by passing speech signals received from a transmitting telephone station set through particular circuitry, such as, for example, a digital filter, in which the coefficients of the digital filter are selected in a conventional manner to increase the level of speech signals occurring within a particular range of frequencies,—illustratively a frequency range of 100–300 Hz. In an illustrative embodiment of the invention, the digital filter may be arranged to increase the gain of speech signals occurring within the aforementioned range by, for example, 10–15 decibels (dB) relative to the gain provided at, for example, 1000 Hz. This gain treatment is illustrated by response curve 20, in which the gain within the range of frequencies of 100 Hz to 300 Hz (or 100 Hz to 400 Hz) is greater than that of the remainder of curve 20, which is relatively flat.

Thus, the application of such compensation to speech signals received by network 100 results in restoring the speech energy that was lost at the transmitter of the transmitting telephone station set, as illustrated by frequency response curve 25, which, as a result of being virtually flat, yields a more representative speech spectrum to the subscriber at station S2 than response curve 15 (FIG. 1). Accordingly, as a result of such compensation, network 100, for the first time, delivers to the receiving telephone station set speech signals that more truly represent the speaker's voice.

In an illustrative embodiment of the invention, the aforementioned digital filter was implemented using a commercially available digital filter, such as, for example, the DEQ7 digital equalizer available from the YAMAHA Corporation. The DEQ7 digital equalizer is programmable, allowing a user thereof to customize the equalization of a signal to meet a desired objective. That is, the user may set the gain of any one of a plurality of frequency bands between 63 Hz and 16 kHz to a desired value between −18.0 db and +18.0 db, in which a preset, or default value is set at 0 db. In our illustrative implementation, the gain of the frequency bands covering 125 Hz through 360 Hz were programmed to approximately meet the aforementioned gain of 10–15 dB, and the gain of the remaining bands were programmed to meet the preset value. The programming of the DEQ7 therefore effectively covered the desired frequency range below 300 Hz.

As mentioned above, such compensation may be disposed at any point along a telephone connection between two telephone sets. We have recognized, however, that selecting the optimum point for the location of such compensation within a telecommunications network is not a trivial task, and is indeed nonobvious. The reason for this is that a telephone connection involves the cooperation between complex switching equipment. For example, a large network such as the AT&T network, employs a large number of complex switching offices interconnected by thousands of miles of transmission links and many different types of transmission equipment such as echo cancelers, multiplexers, synchronization systems, etc., to establish a telephone connection between virtually any two telephone stations in the U.S. In addition, a large network using such resources provides a number of different telecommunications services, and a variety of access arrangements to deliver such services to its subscribers. Thus, the optimum location for such compensation within a telecommunications network needs to be one which does not degrade the delivery of such services.

In view of the foregoing, and after carefully studying the various switching aspects and services provided by a large network, we have recognized that one such an optimum location could be, in accord with an aspect of the invention, a transmission element centrally disposed in network 100. One such transmission element is an echo canceler.

As is well-known, transmission media may include, inter alia, digital circuitry for processing voice signals. Such circuitry typically includes a digital device adapted to effectively remove from digitized speech signals so-called echo signals. Such a device is commonly referred to as an echo canceler. We have recognized that an echo canceler, in accord with an aspect of the invention, represents one of a number of ideal locations within network 100 at which the inventive method may be employed to enhance the quality of speech signals.

Figure 3:
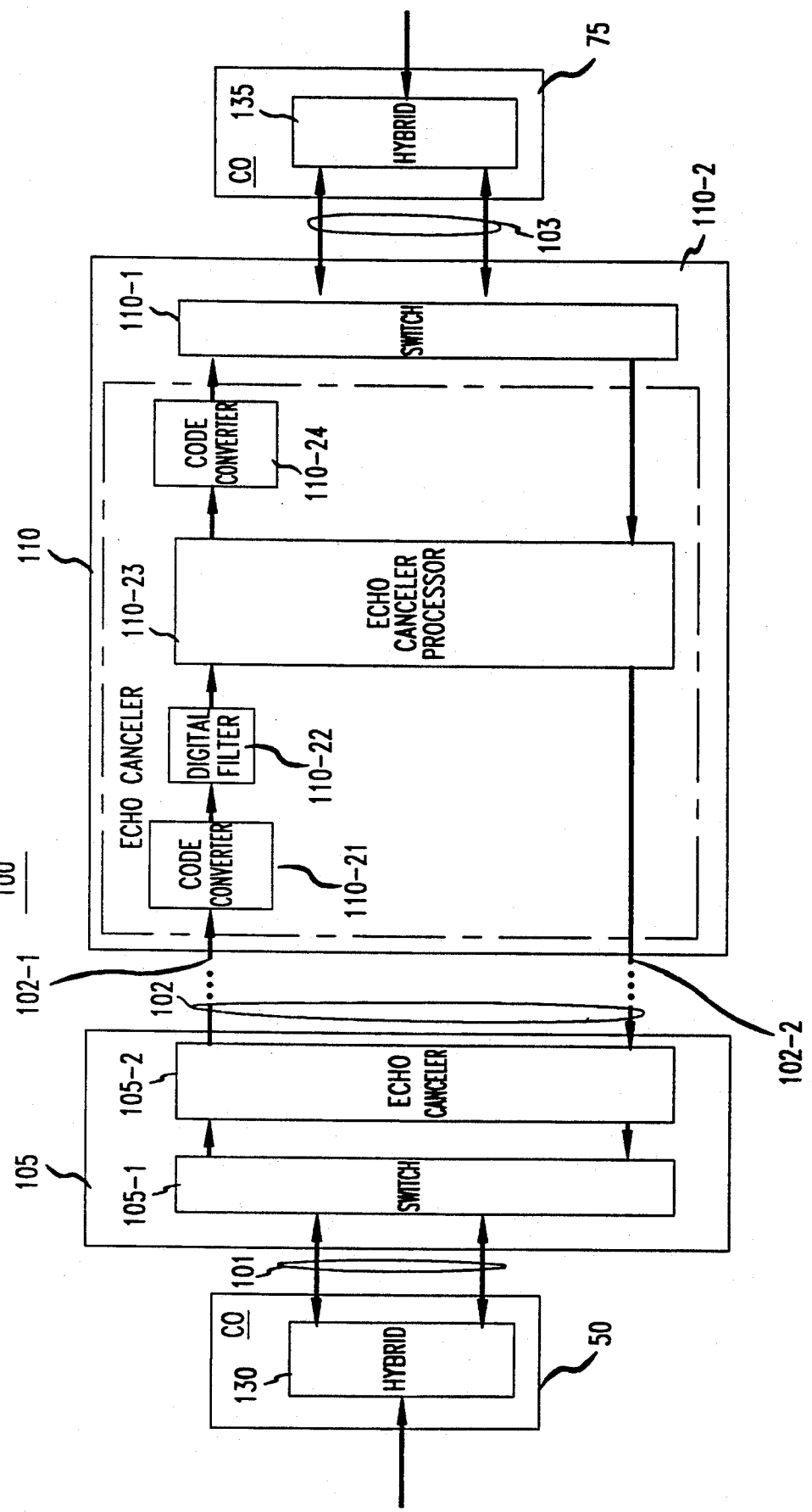
FIG. 3 is an illustrative block diagram of the telecommunications network of FIG. 1 in which the invention may be practiced.

Turning then to FIG. 3, there is shown in more detail toll switching offices 105 and 110 of network 100, in which each such office includes, inter alia, a switching element, e.g., switches 105-1 and 110-1, which may be, for example, the well-known 4ESS switch available from AT&T. Offices 105 and 110 also include echo canceling circuitry, which is used to interface a switch output port, or digroup terminal (not shown) with transmission media, such as communications path 102. Communications path 102 is shown in the Figure as two oppositely directed transmission paths 102-1 and 102-1. For the sake of brevity and clarity, only one echo canceler circuit is shown in the FIGURE for each of the toll offices 105 and 110, namely circuits 105-2 and 110-2. Since echo cancelers 105-2 and 110-2 perform essentially the same functions, a discussion of one such circuit pertains equally well to the other.

Specifically, as is well-known, an echo canceler performs a number of signal processing functions. One such function is the cancellation of an echo signal that may be present in speech signals. An echo signal is a reflection of a transmitted signal and typically occurs as a result of an impedance mismatch between the transmission medium, e.g., telephone line, and a two-wire-to-four-wire hybrid, such as either hybrid 130 or 135. (It is noted that a hybrid is typically associated with a CO, such as COs 50 and 75 and may be disposed at either the line side or trunk side of a CO. In certain instances, a hybrid may be associated with a toll switch.) Accordingly, echo canceler 110-2 and associated circuitry operates in a well-known manner to compare transmitted speech signals received via path 102-1 with signals propagating in an opposite direction via path 102-2, and cancels the latter signals if they are found to be echoes of previously transmitted speech signals. The echo canceler contained in office 105 performs a similar function by comparing transmitted speech signals received via path 102-2 with signals traveling in an opposite direction via path 102-1.

The echo canceler circuitry also includes code converters 110-21 and 110-24. Converter 110-21 operates to convert speech signals encoded in the well-known mu-255 law format (or in certain instances a so-called A-law format) into a linear format for presentation to echo canceler processor 110-23 via digital filter 110-22. Code coverter 110-24 performs an opposite function. That is, converter 110-24 converts linear encoded speech signals that it receives from canceler 10-24 into the mu-255 law format (or A-law format) before such signals are supplied to switch 110-1 for ultimate delivery to a receiving telephone station set (e.g., station set S2 shown in FIGS. 1 and 2).

Digital filter 110-22 implements the inventive method in echo canceler 110-2. A similar circuit implements the invention in echo canceler 105-2. The way in which a digital filter is implemented is well-known and will not be discussed herein. However, it suffices to say digital filter 110-22, as well as the digital filter contained within the echo canceler of trunk 105-2, multiplies the response of speech signals that it receives with the response of curve 20 shown in FIG. 2, in which the response of curve 20 is characterized by the digital filter coefficients. In this way, those speech signals having frequencies below, for example, 300 Hz, are multiplied by the response of the filter which raises the energy level of those signals by a predetermined value—illustratively 10 to 15 decibels. Speech signals having frequencies above, for example, 300 Hz, are multiplied by the remainder of the filter response which raises the level of those signals by another predetermined value—illustratively 0 decibels.

Advantageously, then, network 100 is arranged in accord with the inventive method to enhance the quality of speech signals received via one telephone line, e.g., line 101, before those signals are delivered to another telephone line, e.g., line 103, and vice-versa.

The foregoing is merely illustrative of the principles of the invention. Those skilled in the art will be able to devise numerous arrangements, which, although not explicitly shown or described herein, embody those principles and are within its spirit and scope. In particular, it is recognized of course that the desired result may still be achieved even though the inventive enhancement method may be disposed at some other point along the aforementioned connection, as will be discussed below. For example, the inventive compensation method may be readily disposed within a central office. In particular, a digital circuit implementing the steps of the invention may be disposed in either a central office incoming or outgoing trunk. In this way, speech signals associated with either an intraoffice or interoffice call may enjoy such compensation. As another example, if the station sets are associated with a business communication system, such as a private branch exchange, then the inventive compensation method may be employed in the business communication system to improve the quality of speech signals that are processed solely by that system. As a further example, the steps of the inventive method may be employed in a telephone station set. However, in view of the fact that millions of such sets are currently in use in the United States, the cost of implementing the invention in such station sets would be exceedingly high. Advantageously, then, all such station sets may still enjoy the results provided by the compensation method by performing such compensation at a central location, namely, network 100, as discussed above. As a further example, the invention may be employed in a so-called enhanced telecommunication service, such as a voice mail service, or a voice announcement service.

We claim:

1. A method of processing a voice signal in a telecommunications network, said voice signal being transmitted by a telephone station set having a nonlinear response such that said telephone station set decreases the amplitude of components of said voice signal having frequencies below a predetermined frequency, said method comprising the steps of establishing a network connection to forward said voice signal to a destination telephone station set via a processing element, and in said processing element, equalizing the amplitude of the components of said voice signal having frequencies below said predetermined frequency with respect to other components of said voice signal.

2. The method set forth in claim 1 wherein said processing element is co-located in said network with a telecommunications switch.

3. The method set forth in claim 2 wherein said step of equalizing is performed by circuitry co-located in said network with echo cancellation circuitry.

4. The method set forth in claim 1 wherein said predetermined frequency is within the range of 300 Hz to 400 Hz.

5. A method of processing voice signals in a telecommunications network, said voice signals being transmitted from a first telephone station set to a second telephone station set, said method comprising the steps of establishing a connection through said network so that a voice signal received from said first telephone station set may be processed and then forwarded to said second telephone station set, said voice signal received from said first telephone station set having low frequency components within a predetermined range of frequencies such that the amplitudes of said low frequency components have been decreased by said first telephone station set, and processing said received signal in a network element which boosts the amplitudes of said low frequency components relative to the amplitudes of other components of said voice signal.

6. The method set forth in claim 5 wherein said step of processing is performed in a toll switch within said telecommunications network.

7. The method set forth in claim 6 wherein said step of processing is performed in circuitry co-located in said network with echo cancellation circuitry.

8. The method set forth in claim 5 wherein said predetermined range of frequencies is below a frequency of substantially 400 Hz.

9. The method set forth in claim 5 wherein said predetermined range of frequencies is substantially between 100 Hz and 300 Hz.

10. A method of processing a voice signal in a telecommunications network, said voice signal being transmitted by a telephone station set for delivery to a destination via said network, said station set decreasing the amplitudes of components of said voice signal having frequencies below a predetermined frequency, said method comprising the steps of establishing a network connection so that said voice signal may be forwarded from said station set to said destination via a network element, and compensating said voice signal in said network element such that the amplitudes of only said components having frequencies below said predetermined frequency are compensated in accordance with a predetermined gain characteristic.

11. The method set forth in claim 10 wherein said network element is co-located in said network with a telecommunications switch.

12. The method set forth in claim 11 wherein said step of compensating is performed in circuitry co-located in said network with echo cancellation circuitry.

13. The method set forth in claim 10 wherein said predetermined frequency is within the range of 100 Hz to 400 Hz.

14. A method of processing a voice signal in a telecommunications network, said voice signal having a nonuniform frequency distribution as a result of a decrease in the amplitudes of low frequency components of said voice signal, said low frequency components having frequencies below a predetermined frequency, said method comprising the steps of establishing a connection to forward said voice signal when it is received toward an intended destination via a signal processor, and in said signal processor, responding to receipt of said voice signal by increasing the amplitudes of only said low frequency components.

15. The method set forth in claim 14 wherein said signal processor is co-located in said network with a telecommunications switch.

16. The method set forth in claim 14 wherein said signal processor is co-located in said network with echo cancellation circuitry.

17. The method set forth in claim 14 wherein said predetermined frequency is within the range of 100 Hz to 400 Hz.

18. A method for use in a telecommunications network for processing a voice signal that originated from a telephone station set, said telephone station set having a frequency response characteristic which rolls off at low frequencies, said method comprising the steps of establishing a network connection to forward said voice signal to a destination telephone station set via a processing element, and processing said voice signal in said processing element in such a way as to offset only the effect of the roll off of said frequency response characteristic.

19. The method set forth in claim 18 wherein said processing comprises the step of increasing the signal level of said voice signal at said low frequencies relative to the signal level of said voice signal at other frequencies.

20. The method set forth in claim 19 wherein said processing element is co-located in said network with a telecommunications switch.

21. The method set forth in claim 19 wherein said processing element is co-located within said network with echo cancellation circuitry.

22. A method for use in a telecommunications network for processing a voice signal that originated from a telephone station set, said telephone station set having a frequency response characteristic which provides attenuation at low frequencies relative to other frequencies, said method comprising the step of establishing a network connection to forward said voice signal to a destination telephone station set via a processing element, and processing said voice signal in said processing element in such a way as to offset only the effect of said low-frequency attenuation.

23. The method set forth in claim 22 wherein said processing comprises the step of increasing the signal level of said voice signal at said low frequencies relative to the signal level of said voice signal at other frequencies.

24. The method set forth in claim 22 wherein said processing element is co-located in said network with a telecommunications switch.

25. The method set forth in claim 22 wherein said processing element is co-located within said network with echo cancellation circuitry.

26. A method for use in a telecommunications network, said method comprising the step of establishing a network connection to forward a voice signal to a destination telephone station set via a processing element, and processing said voice signal within said processing element, said processing element having a frequency response characteristic which provides gain within a range of low frequencies relative to frequencies outside of said range, whereby the quality of voice signals subjected to low-frequency attenuation by originating telephone station sets is enhanced.

27. The method set forth in claim 26 wherein said processing element is co-located in said network with a telecommunications switch.

28. The method set forth in claim 27 wherein said processing element is co-located within said network with echo cancellation circuitry.

* * * * *